(12) United States Patent
Miao et al.

(10) Patent No.: US 7,697,930 B2
(45) Date of Patent: Apr. 13, 2010

(54) METHOD AND APPARATUS FOR MOBILITY MANAGEMENT IN WIRELESS NETWORKS

(75) Inventors: Yu-Ben Miao, Tainan Hsien (TW); Tai-Xing Yu, Tainan (TW); Ting-Kai Hung, Hsinchu (TW); Ji-Feng Chiu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 952 days.

(21) Appl. No.: 11/377,076

(22) Filed: Mar. 16, 2006

(65) Prior Publication Data

US 2007/0147298 A1 Jun. 28, 2007

(51) Int. Cl.
*H04W 4/00* (2009.01)
(52) U.S. Cl. .............. 455/432.1; 455/435.1; 455/445; 455/456.3; 455/456.5; 455/458; 370/328; 370/338; 370/349; 370/352; 370/428
(58) Field of Classification Search ......... 455/410–411, 455/426.1, 432.1, 456.5; 370/230, 254, 310, 370/328, 338, 349, 352, 401, 412, 428, 410–411, 370/426.1, 432.1, 456.5
See application file for complete search history.

(56) References Cited

U.S. PATENT DOCUMENTS

| | | | |
|---|---|---|---|
| 6,675,208 B1 * | 1/2004 | Rai et al. .................... 709/224 |
| 6,766,171 B2 | 7/2004 | Pan et al. .................... 455/439 |
| 2002/0191593 A1 | 12/2002 | O'Neill et al. .............. 370/352 |
| 2003/0087629 A1 * | 5/2003 | Juitt et al. .................... 455/411 |
| 2004/0114559 A1 * | 6/2004 | Wang .......................... 370/338 |
| 2004/0203593 A1 * | 10/2004 | Whelan et al. .............. 455/411 |
| 2005/0079823 A1 * | 4/2005 | Kurek et al. .............. 455/67.11 |
| 2005/0250529 A1 * | 11/2005 | Funnell et al. .............. 455/525 |
| 2006/0009213 A1 * | 1/2006 | Sturniolo et al. ......... 455/426.1 |
| 2006/0165103 A1 * | 7/2006 | Trudeau et al. ............. 370/401 |
| 2006/0246901 A1 * | 11/2006 | Sivakumar et al. .......... 455/436 |
| 2007/0140189 A1 * | 6/2007 | Muhamed et al. ........... 370/338 |
| 2007/0232307 A1 * | 10/2007 | Ibrahim et al. .............. 455/436 |

FOREIGN PATENT DOCUMENTS

WO WO 01/31472 5/2001

* cited by examiner

*Primary Examiner*—Dwayne Bost
*Assistant Examiner*—Inder P Mehra

(57) ABSTRACT

This invention provides a method and apparatus that uses a mobility management server (MMS) device for supporting mobility management in wireless networks. With the MMS device for services of resource management and packet relay, this invention speeds up the handover procedure for a mobile device switching from a first network domain to a second network domain in a wireless network environment having a session initiation protocol (SIP) server. When the mobile device needs to switch to the second network domain, the MMS allocates the required resources for packet relay, provides the related information for the second network domain, and takes care of the packet relay. This invention shortens the inter-domain handover latency and reduces the number of lost packets during the handover procedure. Thereby, the transmission efficiency of the present invention meets the requirement for real-time multimedia applications.

17 Claims, 7 Drawing Sheets

MMS:mobile management server
MS:mobile device
CN:corresponding node
AP1, AP2:access point
501-507:mobile management step

FIG. 7 ically to a method and
apparatus for mobility management in wireless networks.
Such a wireless network is featured with a mobility management server providing efficient inter-domain handover.

BACKGROUND OF THE INVENTION

To support the mobility of a communication/mobile device in a wireless network, there are procedures in both media access control (MAC) layer and network layer in a network configuration trying to maintain the upper level on-going communication uninterrupted. The MAC layer handover occurs when a mobile device leaves one access point (AP) and enters another AP. The network layer handover occurs when a mobile device switches from one network domain into another network domain under a new internet protocol (IP) address, which is mainly based on mobile IP techniques. If a mobile device needs to switch across different network domains, in other words, when a mobile device leaves the home network and enters a foreign network, this mobile device has to obtain a new IP address in the foreign network as the care of address (CoA), and at the same time, needs to register the new IP address in the foreign network at the home network, so that the home agent can automatically relay the transmission packets for the mobile device to the new IP address in the foreign network and keeps the ongoing communication uninterrupted. With the current internet operation in reality, the prevalence of mobile IP is still limited.

Figure 1:
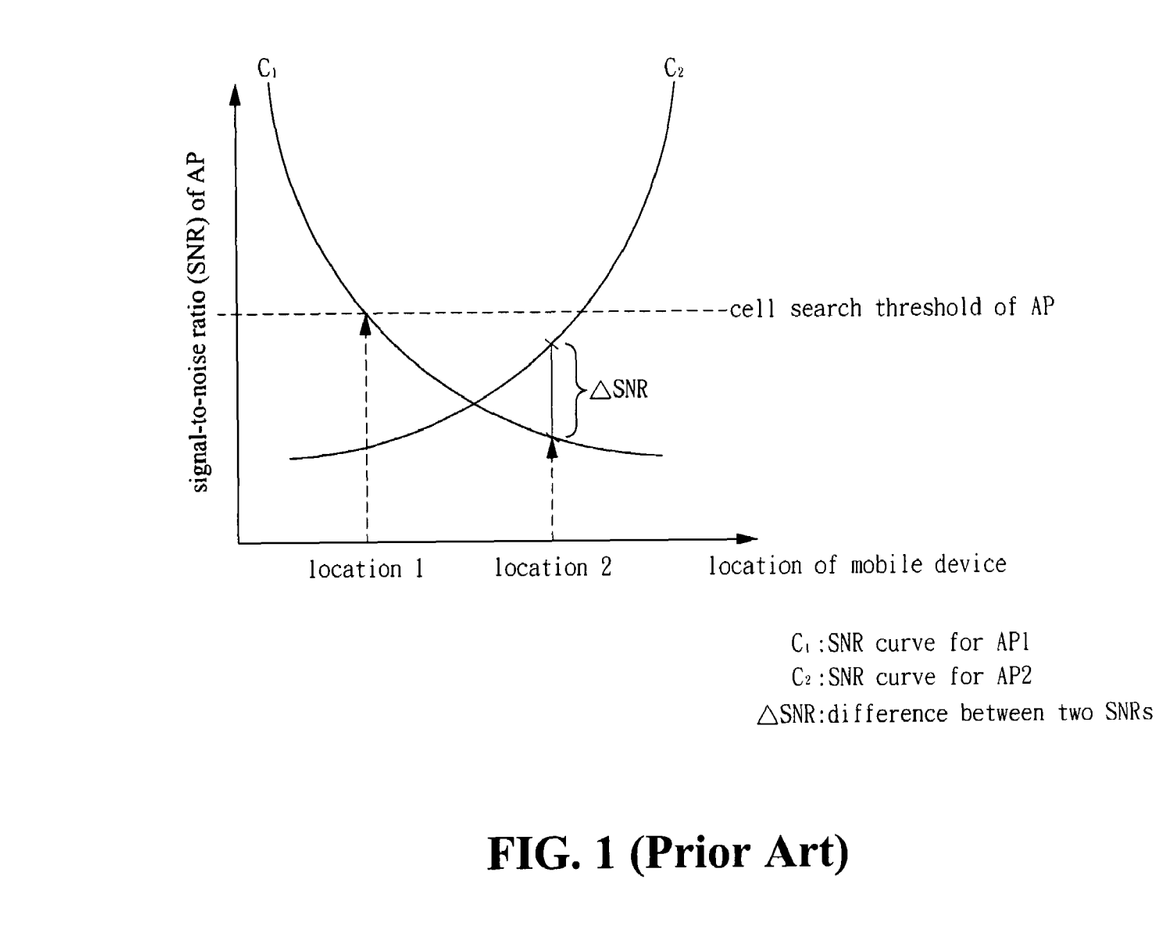
FIG. 1 illustrates the procedure when a mobile device switches from an access point AP1 to a new access point AP2.

FIG. 1 illustrates the procedure involved for a mobile device switching from access point AP1 to access point AP2. When the mobile device detects the signal-to-noise ratio (SNR) of AP1 is lower than its cell search threshold, an automatic scan mechanism is activated for a new access point. When the signal magnitude of AP2 is stronger than the signal magnitude of AP1 by a certain value ($\Delta$SNR), the mobile device automatically handovers to the new AP2.

Figure 2:
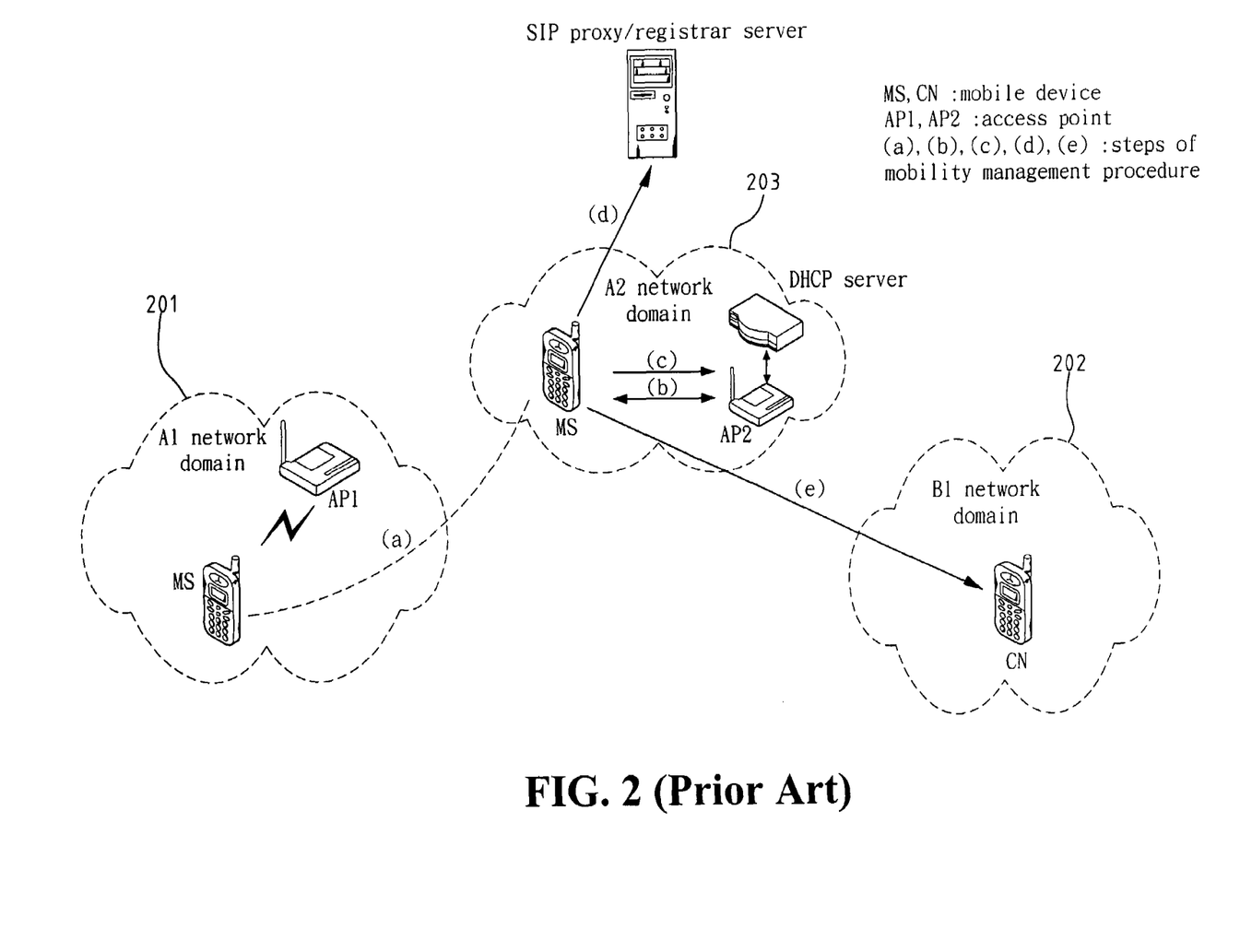
FIG. 2 illustrates an example of a conventional mobility management system in a SIP based wireless network environment.

FIG. 2 shows an example for a session initiation protocol (SIP) based mobility management in a wireless network. Referring to FIG. 2, there are two SIP clients in communication session, the mobile device MS in A1 network domain 201 and the corresponding node CN in the B1 network domain 202. While the mobile device MS switches from A1 network domain 201 to a new A2 network domain 203, a conventional mobility management procedure includes the following steps.

Step a. While switching network domains, the mobile device MS keeps on detecting and determining if the signal from AP1 has dropped below the cell search threshold. If yes, then mobility management procedure jumps to step b, otherwise, repeats the current step a.

Step b. The mobile device MS initiates a scan mechanism for a new access point and detects a stronger signal from the AP2 of the network domain A2. With MAC layer connection, mobile device MS connects to the AP2 of the A2 network domain. At this step, the communication status of the mobile device MS and the corresponding connection node CN is temporarily disconnected.

Step c. The mobile device MS. via AP2. obtains an IP address within network domain A2 from the server for dynamic host configuration protocol (DHCP). At this step, the communication status of the mobile device MS and the corresponding connection node CN is still temporarily disconnected.

Step d. The mobile device MS registers a new IP address in network domain A2 at the SIP proxy/registrar server, so that the other clients can reach the mobile device via the SIP proxy/registrar server. At this step, the communication status of the mobile device MS and the corresponding connection node CN is still temporarily disconnected.

Step e. The mobile device MS issues an SIP INVITE message to the corresponding connection node CN to re-establish the communication. Only with successful SIP INVITE process can the previously broken connection be re-established.

Whenever a mobile device switches across different domains and needs a new IP address, the fore going handover procedure takes about more than 10 seconds, which includes time for MAC layer, network layer and application layer handovers. For networks providing real-time voice services, due to the lengthy network domain handover time, the communication interruption is too long to be of an acceptable service quality.

Figure 3:
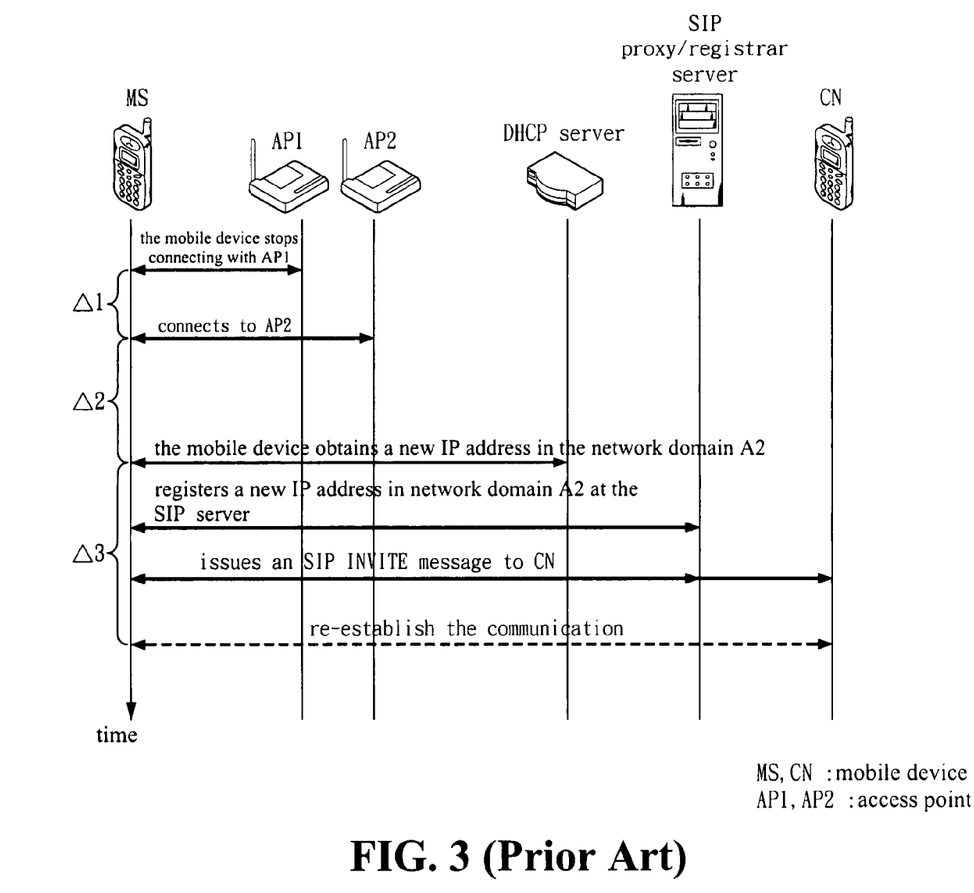
FIG. 3 illustrates the handover latency for a conventional mobile device switching to a new network domain.

When a mobile device moves across different network domains, the sources of the communication interruption come from affected interfaces for MAC layer, network layer and application layer. In the whole domain transition process, the time for service interruption includes three categories as shown in FIG. 3. The time when the mobile device stops connecting with AP1 till the time the mobile device connects to a new AP2 in a new network domain is defined as the MAC layer handover time, denoted as $\Delta1$ in FIG. 3. Secondly, the time when the mobile device starts connecting to the new AP2 till the time the mobile device obtains a new IP address via the DHCP server in the new network domain is defined as the network layer handover time denoted as $\Delta2$ in FIG. 3. Finally, the application layer handover time is defined as the time for re-establishing the communication service with the new IP address in the application layer, which includes the mobile device MS registers a new IP address in network domain A2 at the SIP proxy/registrar server, the mobile device MS issues an SIP INVITE message to the corresponding node CN to re-establish the communication, till the completion of the new communication connection, denoted as $\Delta3$ in FIG. 3.

The total latency for service interruption from mobile device inter-domain handover is the sum of $\Delta1+\Delta2+\Delta3$. In other words, for an efficient mobile communication service, the total handover interruption time, $\Delta1+\Delta2+\Delta3$, can be minimized by speeding up the connection time to a new AP in the MAC layer, by minimizing the time for obtaining a new IP address or even by pre-assigning an IP address in the network layer, and by avoiding the repetition for re-establishing the new connection in the application layer.

The US patent publication 2002/191593 disclosed a method and apparatus for session signaling and mobility management in communication systems. In this method, the session signaling and mobility management is accomplished by SIP integrated with the mobile IP. In a SIP-based configuration, each cell area includes many modules, such as session signaling server module, mobility agent modules, etc. When a mobile device switches to a new cell area, this mobile device first registers itself at the session signaling server module with attached mobile device information before the transition. In the mean while, the session signaling server module informs the mobility agent module and the original mobility agent module for the requesting mobile device of a handover procedure. This handover procedure includes the following steps. The original session signaling server module issues a request message to the session signaling server module of the new cell area, and switches the associated state information of the requesting mobile device to the modules in the new cell area. After receiving the request message, the session signaling server module in the new cell area replies a response message back to the home session signaling server node with the location of the mobile device.

This technique disclosed the method for inter-domain handover, and assures a seamless session after the mobile device switches to the new cell area and obtains a new IP address. This technique, however, still cannot resolve the overhead for requesting a new IP address after the mobile device switches to the new cell area. During the cell area handover, packet loss remains an issue. This technique still cannot fulfill the data transmission quality required by most real-time multi-media service applications.

In the patent WO0131472, with respect to the 3G all IP network environment, disclosed a mobility management protocol to support the real-time and non-real-time multi-media application programs for mobile devices. This technique utilizes and extends the SIP in order to provide domain handover and subnet handover in such a way that a user can always access Internet via the mobile device from any location while roaming in different 3G all IP networks. This technique also supports the portability for the application programs of the transmission control protocol (TCP), so that there is no need to modify the TCP. When a mobile device switches to a new network domain, with SIP INVITE and INFO method, IP address binding and user authentication can both be accomplished. With SIP registration, a new IP address can be obtained from a DHCP server, and the TCP connection on a mobile platform can also be maintained with a media agent named SIP_EYE.

The technique disclosed in this patent starts the process of new registration as well as the informing the corresponding node (CN) and edge router controller of re-establishing new connection and transient tunnel after the communication device switches to a new domain. Consequently, before the new connection is established, the packet loss issue still exists. This technique saves the overhead for requesting a new IP address from the new DHCP, the latency is still needed for completing the registration at the SIP server. The data transmission quality of such technique still cannot fulfill the requirement for real-time multi-media service applications.

A U.S. Pat No. 6,766,171 disclosed a method and apparatus for a duplex soft handover in a network environment with no carrier control. By utilizing the media gateways installed in different network environments, this technique allows a duplex soft handover operation leaving the signaling of the carrier network untouched. In such a configuration, a mobile device always needs to establish a connection via a media gateway before establishing connection with target node. On detecting a mobile device moving into a transition area, a media gateway informs the mobile device to establish a new connection. As the mobile device continues moving, its media gateway automatically handovers into the new connection, and disconnects the original communication.

The technique disclosed in this U.S. Pat. No. 6,766,171 requires the mobile devices to have two receivers. This results in not only higher manufacturing cost but also more power consumption. These two issues affect the evaluation for designing mobile device.

In conclusion, the mobility management in most conventional wireless networks is supported by mobile internet protocol (mobile IP) with home agent and foreign agents to avoid the handover in the application layer procedure. With mobile IP available in lower layers, the upper layer application procedure can minimize the time in $\Delta3$, but still needs overhead for registering a new foreign agent at the home agent. For choosing mobile IP as the network layer protocol, the most criticized issue is triangular routing problem. Besides, the prevalence of mobile IP is still limited. The cost for installing facilities for mobile IP not only includes deploying many home agents and foreign agents, but also involves the fact that the mobile IP needs two IP addresses in most of time in services. These disadvantages are even more unfavorable in the IPv4 environment in which IP address is a rare resource. From the perspective of the whole service latency, the mobile IP approach although reduces the time in $\Delta3$, other mechanism is still needed to minimize both $\Delta1$ and $\Delta2$.

SUMMARY OF THE INVENTION

The present invention overcomes the drawbacks of the aforementioned conventional mobility management method in wireless networks. The technique of the present invention provides a method and apparatus for mobility management in wireless networks, so that the latency for the inter-domain handover procedure for a mobile device switching to a new domain can be minimized.

To accomplish the afore purpose, the present invention is also featured with a new mobility management server (MMS) device to speed up the handover procedure for a mobile device switching to a new network domain, and thus minimize the latency for the whole handover. Such MMS device in the present invention mainly provides resource management service as well as packet relay service.

In the aforementioned wireless network environment configuration, when a mobile device is ready for a handover to a new domain, the mobility management method according to the present invention mainly includes the following steps: (a) the mobile device chooses AP candidates for the new connection; and the corresponding domains for the candidates are referred to candidate domains, (b) the mobile device provides the mobility management server with the related information of the new AP candidates, learns the network information of the candidate domains, and requests the mobility management server to initiate the packet relaying service according to the new network configuration; (c) the mobile device informs the corresponding node (CN) of sending the incoming packets for the mobile device to the MMS device; (d) the MMS device relays the packets for the mobile device according to the new network configuration; (e) the mobile device connects to an AP in the AP candidates, and sets the network configuration file respecting to the corresponding domain of the new AP; and (f) the mobile device updates the registration information at the communication server and informs the corresponding node of sending the packets to the mobile device.

Accordingly, this mobility management method communicates between the mobile device and the MMS device, obtains the information of the neighboring network domains, and requests the MMS device to allocate resource and provide packet relay service, and accomplishes the handover procedure to the new network domain for the mobile device.

Coupling with such mobility management method. the mobility management apparatus of the present invention mainly comprises an MMS device. and extra one or more mobility devices to perform the desired function. Such a MMS device can be realized with one or more mobility servers. The MMS device includes a resource management unit and a packet relay service unit for managing resource for packet relay and performing packet relay function itself.

Since the mobile device acquires a new IP address via DHCP before handover to a new network domain, the $\Delta2$ time in FIG. 3 is thus be reduced. The Δ3 time is also eliminated with the aid of the MMS device for the packet relay. The present invention can reduce the inter-domain handover latency for a mobile device to under a second, and efficiently minimizes the drawback of lengthy interruption for voice services.

The experimental result shows, with the mobility management method of the present invention, the number of lost packets during the inter-domain handover for a mobile device is also significantly reduced.

In the present invention, the mobile device can be a notebook computer, mobile phone, and a personal digital assistant (PDA), etc.

The foregoing and other objects, features, aspects and advantages of the present invention will become better understood from a careful reading of a detailed description provided herein below with appropriate reference to the accompanying drawings.

DETAILED DESCRIPTION OF THE EMBODIMENTS

According to the drawbacks in the conventional technique, in order to optimize the inter-domain handover, other than speeding up the handover in the lower layer of network protocol stacks, by the proper use of the information provided in lower layers to auxiliary the handover in the upper layer communication protocol, the overall handover efficiency can also be effectively enhanced. By adding an MMS device, the present invention can effectively speed up the inter-domain handover for a mobile device. When detecting the signals from the current AP is not good enough, a mobile device requests the MMS device to allocate resources for packet relay and provide the information regarding the new network domain to assist in the handover process. Other than this, the present invention also obtains the related information needed in the handover at both network layer and application layer prior to the MAC layer handover, so that the overall handover latency can be shortened and the real-time multimedia service interruption due to inter-domain transition can be effectively minimized. The mobile device referred in the present invention can be a notebook computer, mobile phone, and a personal digital assistant (PDA), etc.

For ease of explanation for the present invention, in the following description, examples of SIP, wireless local area network (WLAN), and voice over IP services are used to illustrate the design of signaling protocol, wireless networks, and communication services. The present invention, however, is not limited to the examples described thereof. Similar applications like being used in real-time multimedia protocols, such as H.323, or being used in different wireless networks, such as WiMAX, and being used in other communication services, such as Video over IP, etc. A communication sever referred in the description is generally defined as a network node with server function. Such servers, which include a general SIP, a H.323 server, or a node with service capability in a peer-to-peer network, etc., can all be used in the present invention.

Figure 4:
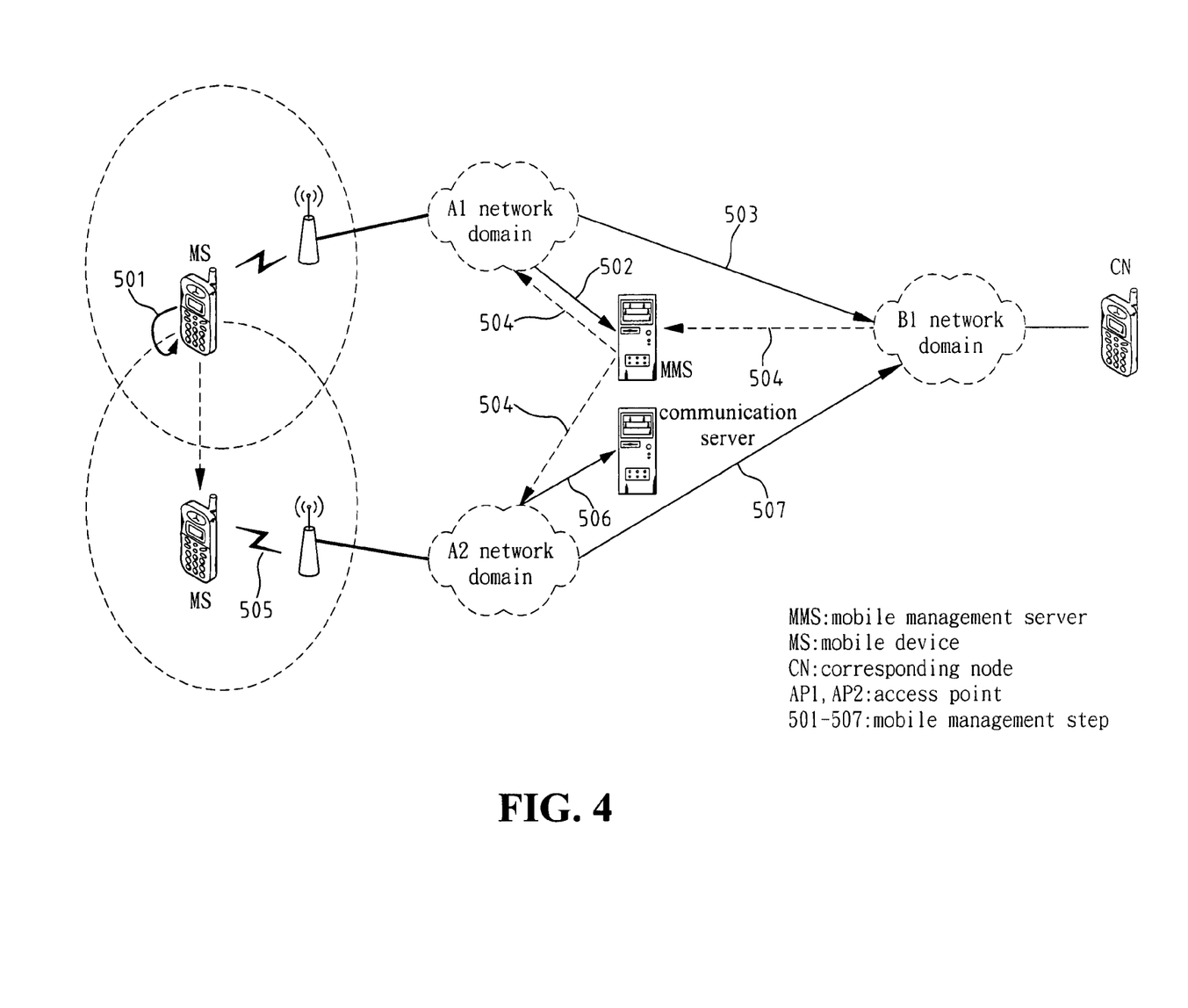
FIG. 4 is a diagram illustrating a mobility management configuration in an SIP based wireless network environment according to the present invention.

FIG. 4 is a diagram illustrating a mobility management configuration in a SIP based wireless network environment according to the present invention. Without losing generality, referring to FIG. 4, with an MMS device, the present invention accomplishes the inter-domain handover for a mobile device through functional management steps 501-507. Such server device can be realized with one or more mobile servers. Steps 501-507 will be described in detail in FIG. 5.

In the configuration illustrated in FIG. 4, the mobility management apparatus according to the present invention can also include one or more coupled mobile devices in addition to the MMS device. The MMS device includes resource management service unit and packet relay service unit, which are described in detail respectively as follows.

(I) Resource management service unit: responsible for managing the resource needed for packet relay. When a mobile device is ready for handover to a new network domain, this mobile device can request the resource management service unit to allocate resource for packet relay. Also the mobile device can request the resource management service unit to provide an IP address in the new network domain. Resources needed for packet relay include memory buffer, bandwidth and relay IP address/port, etc.

The resource management service unit can also provide the mobile device with the related information about the access point in the new network domain and also the network information of the new network domain. The related information regarding the access point in the new network domain includes service set ID (SSID), media access control (MAC) address of the access point, and the channel used for the access point. The network information of the new domain includes IP address, netmask or gateway address.

(II) Packet relay service unit: responsible for packet relay. While in conversation and before switching into a new network domain, a mobile device can request the data relay service unit for relaying packets, and also requests the receiver node to temporarily send packets to the MMS device. According to the information provided by the resource management service unit, the packet relay service unit can then relay the packets for the mobile device to the candidate IP address in the new network domain. The candidate network domain could be the network domain currently in use, or the new network domain which the MS will potentially handover to.

Figure 5:
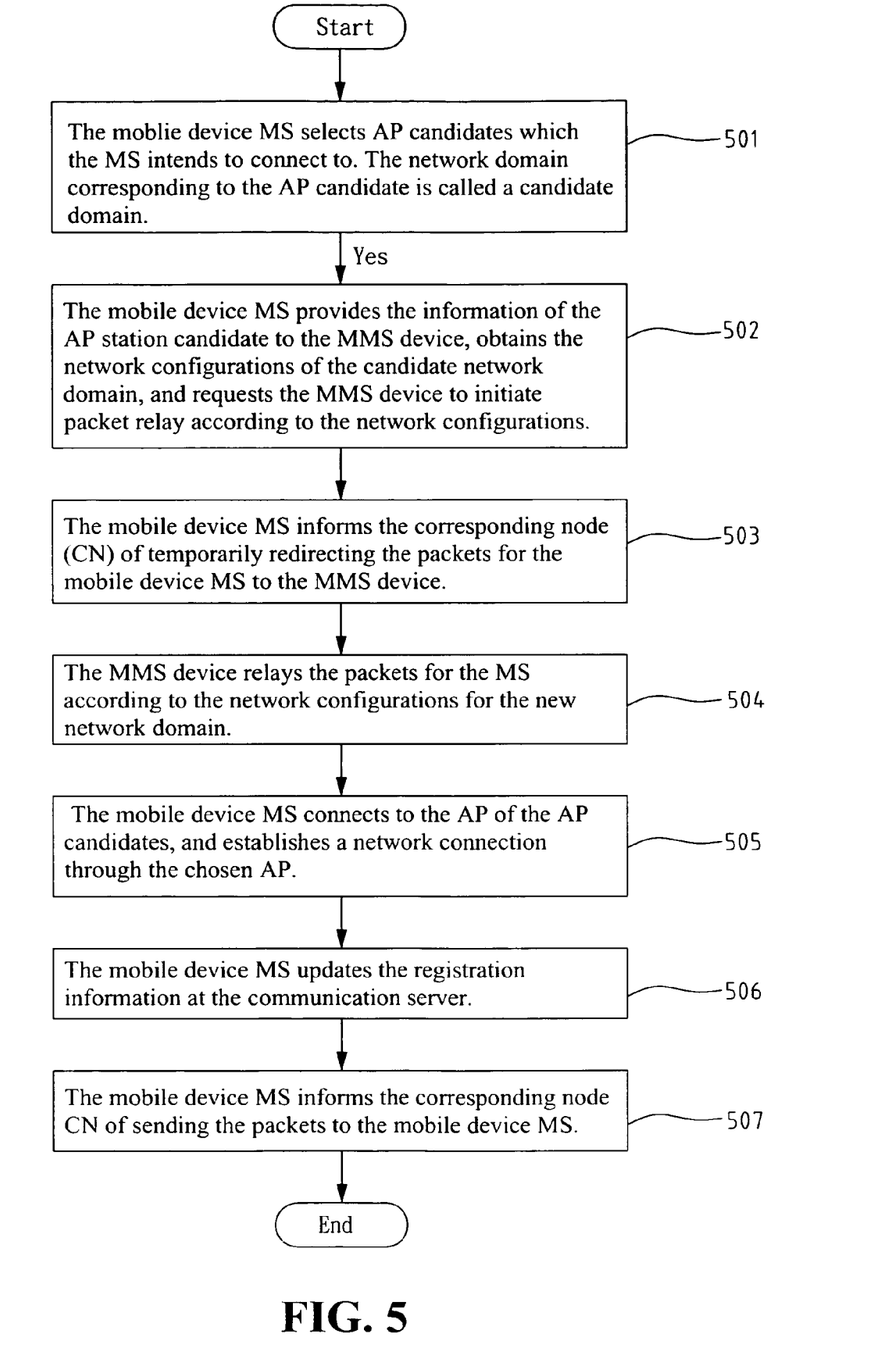
FIG. 5 illustrates the flowchart for the mobility management method according to the present invention.

According to the present invention, FIG. 5 describes a mobility management method in a SIP-based wireless network with an additional MMS device. Steps 501-507 illustrate the consolidated inter-domain handover for a mobile device. With the assumption that the mobile device MS in the network domain A1 in FIG. 4 and the corresponding node CN in network domain B1 have established on-going connection, and the mobile device MS keeps on moving. The following describes steps 501-507.

Step 501: The mobile device MS selects AP candidates which the MS intends to connect to. The network domain corresponding to the AP candidate is called a candidate network domain. Such AP candidate can be one or more as the AP1 and AP2 shown in FIG. 4. The corresponding candidate network domains are A1 and A2 as shown in FIG. 4. The mobile device MS can apply one or more than one AP selection mechanism to select an AP candidate, such mechanism can be a comparison of the signal quality of the connected AP versus the signal quality of the neighboring APs.

Step 502: The mobile device MS provides the information of the AP candidate to the MMS device, obtains the network configurations of the candidate network domain, and requests the MMS device to initiate packet relay according to the network configurations. The information of the AP candidate includes Basic Service Set Identifier (BSSID), Service Set Identity (SSID), and Media Access Control address for each AP of AP candidate. If the MS device does not have the network configurations regarding the candidate domain, the MS device can apply a predetermined mechanism to get the network configurations and inform the MMS device the network configurations. Such network configurations include the IP address used by the mobile device. the gateway address or netmask, etc. The predetermined mechanism for obtaining the network configurations could be from the mobility resource management service unit of the MMS device, or via a DHCP server, or could be from preset network configurations, etc.

Step 503: The mobile device MS informs the corresponding node (CN) of temporarily redirecting the packets for the mobile device MS to the MMS device. The corresponding node (CN) then sends the packets to the MMS device after the notice from the mobile device MS.

Step 504: The MMS device relays the packets for the MS. According to the network configurations for the new network domain provided by the mobile device MS, the MMS device relays the packets for the mobile device MS to the IP addresses of the candidate domains which the mobile device might use. Such candidate domains are shown as A1 and A2 in FIG. 4.

Step 505: The mobile device MS connects to the AP of the AP candidates, and establishes a network connection through the chosen AP. The mobile device MS can use its evaluation mechanism, such as comparison of the signal quality of AP candidates, for deciding the AP to connect to.

Step 506: The mobile device MS updates the registration information at the communication server. The registration information can include the IP address of the mobile device or the registration expiration time, etc.

Step 507: The mobile device MS informs the corresponding node CN of sending the packets to the mobile device MS. The corresponding node CN sends packets to the mobile device MS after the notice.

In step 503, the mobile device MS requests the corresponding note CN to send the packets for the mobile device MS to the MMS device by sending SIP INVITE or UPDATE messages. Similarly, in step 507, the mobile device MS also sends informing signals of INVITE or UPDATE to the corresponding node CN, and requests the corresponding node CN to send the packets to the mobility device MS.

In step 505, the mobile device MS, with its evaluation mechanism, can dynamically switch the connected AP. In step 504, since the MMS device relays packets for the mobile device MS to all candidate IP addresses the mobile device MS might be using, the mobile device MS can always receive its packets even the mobile device MS switches connected AP dynamically.

Step 506 and step 507 can be executed in parallel and there is no sequential dependency.

When finishing step 507, the mobile device MS can inform the MMS device of stopping the packet relay service and thus releasing the allocated resources. Alternatively, the MMS device can be set up to automatically stop packet relay service after a predetermined period of time and release the allocated resources.

Figure 6:
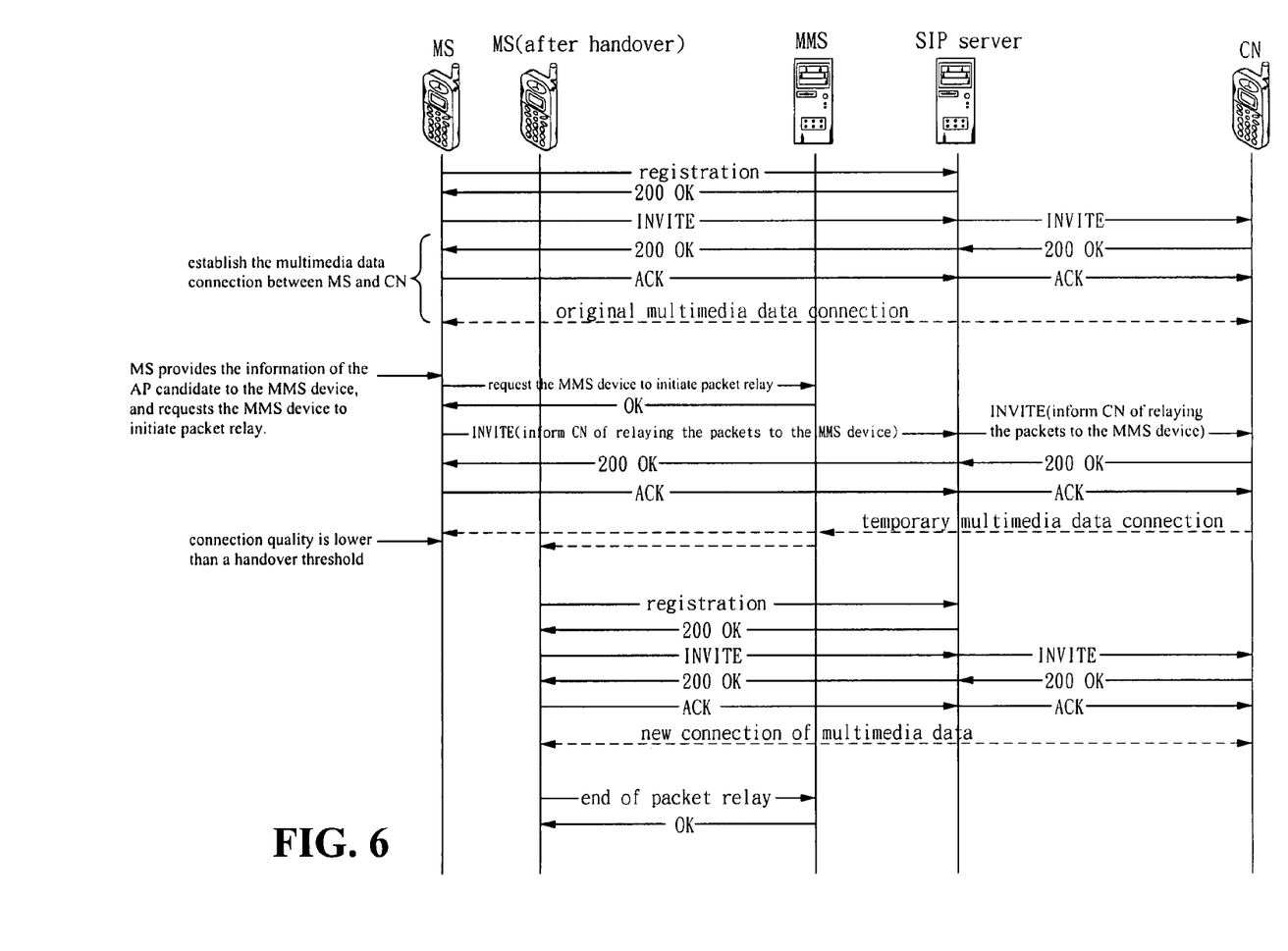
FIG. 6 shows an example of the handover procedure via the MMS device according to the present invention.

Referring to the configuration in FIG. 4 as well as the afore descriptive flowchart in FIG. 5, FIG. 6 illustrates an example of a complete cycle of an inter-domain handover with the MMS device according to the present invention, wherein, the mobile device MS switches from network domain A1 to network domain A2 while in the conversation with the corresponding node (CN).

With the service provided by the MMS device, the present invention reduces the inter-domain handover latency for a mobile device in transition from the original $\Delta 1+\Delta 2+\Delta 3$ down to $\Delta 1+\Delta 2'$, where $\Delta 2'$ is merely the time for the mobile device to set a new IP address. Since the mobile device MS has already gotten an IP address in the new domain A2 in step 502, there is no need to request and wait for a new IP address for the target domain in the network layer handover. With the present invention, the interrupted time due to the network layer handover $\Delta 2'$ is much shortened compared with the $\Delta 2$ with the conventional technique. The interrupted time in the application layer handover with the conventional technique $\Delta 3$ is also eliminated with the aid from the MMS for the packet relay services. The experimental result shows that the present invention effectively reduces the inter-domain handover latency for a mobile device from a few seconds to only a few miniseconds.

Figure 7:
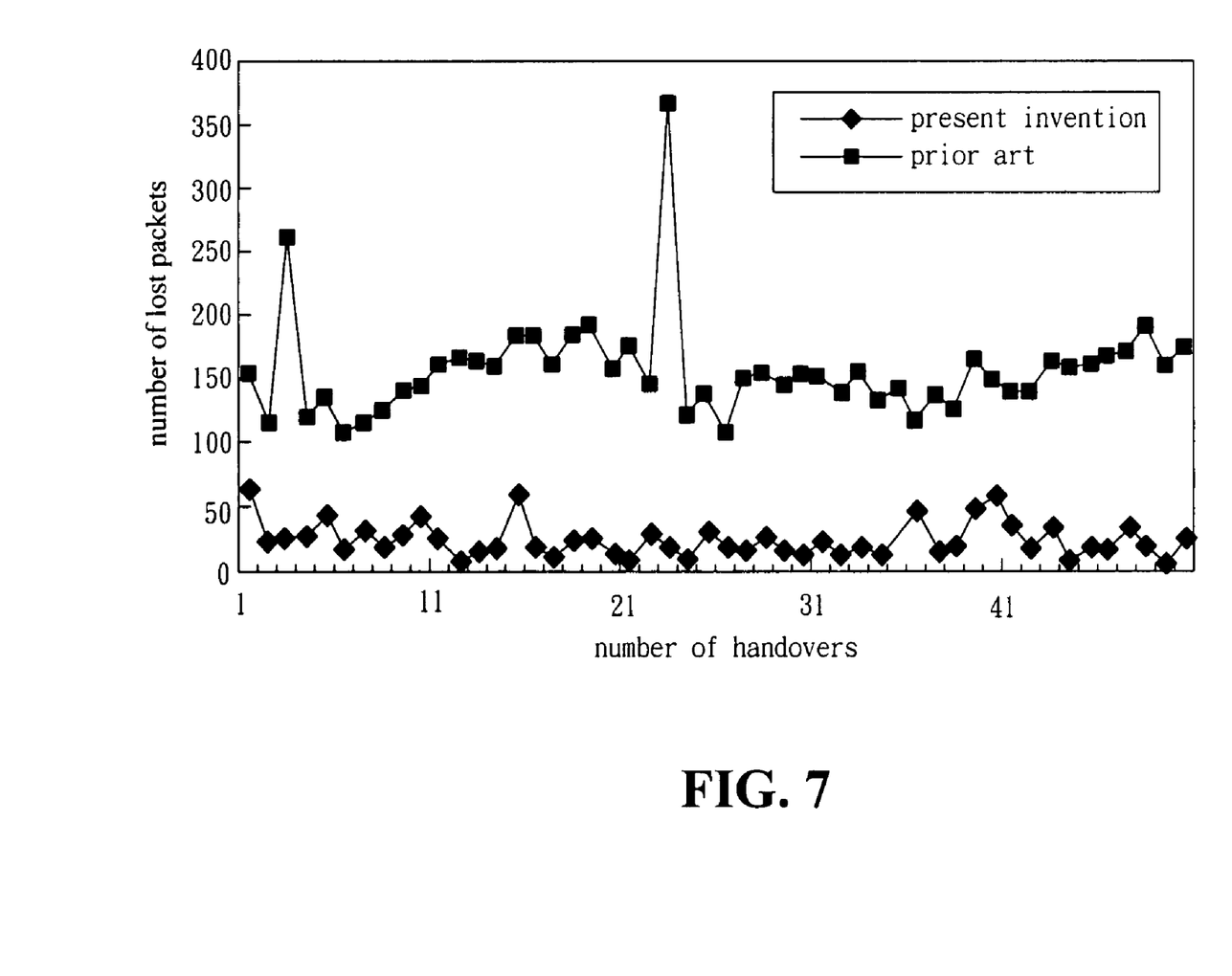
FIG. 7 shows the comparison of the number of lost packets between the mobility management system of the present invention and a conventional mobility management system in which a new IP address is supported by a DHCP server.

FIG. 7 shows the comparison of the number of lost packets between the mobility management system of the present invention and a conventional mobility management system in which a new IP address is supported via a DHCP server. The vertical axis represents the number of lost packets, while the horizontal axis represents the number of handovers. The experimental result in FIG. 7 shows that the present invention effectively reduces the number of lost packets in inter-domain handover. Thereby, the data transmission quality of the present invention well meets the requirement for real-time multimedia applications.

Although the present invention has been described with reference to the embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for mobility management in wireless networks, wherein said wireless networks comprise a mobility management server (MMS) device, one mobile device in a first network domain having connection to one corresponding node, and handover of said mobile device to a second network domain comprises the steps of:
   (a) said mobile device selecting one or more access point (AP) candidates which said mobile device intends to connect to, wherein a network domain corresponding to each said AP candidate is a candidate network domain;
   (b) said mobile device providing said MMS device with the information of said AP candidates, obtaining network configurations of the candidate network domains from said MMS device, and requesting said MMS device to initiate a packet relay service according to the network configurations;

(c) said mobile device informing said corresponding node of temporarily redirecting packets for said mobile device to said MMS device;

(d) said MMS device relaying the packets for said mobile device by relaying the packets to two or more candidate IP addresses that said mobile device may use including IP address in said first network domain, and IP addresses in all candidate network domains;

(e) said mobile device connecting to a chosen AP of said AP candidates, and establishing a network connection through the chosen AP; and (f) said mobile device updating registration information at a communication server of said chosen AP, and informing said corresponding node of sending packets to said mobile device, wherein, there is no sequential dependency between the two actions of said updating registration information at the communication server and said informing the corresponding node to send packets to said mobile device.

2. The method for mobility management in wireless networks as claimed in claim 1, wherein, in said step (b), said mobile device obtains said network configurations of said candidate network domains via a preset mechanism, and informs said MMS device of said network configurations.

3. The method for mobility management in wireless networks as claimed in claim 1, wherein, in said step (b), said network configurations for the use of said mobile device includes IP address, gateway address, and netmask, or any combination of afore items.

4. The method for mobility management in wireless networks as claimed in claim 1, wherein, in said step (c), the corresponding node sends packets for said mobile device to said MMS device after being informed by said mobile device.

5. The method for mobility management in wireless networks as claimed in claim 1, wherein, in said step (d), said MMS device relays packets for said mobile device to the IP addresses reserved by said mobile device in said candidate network domains according to said network configurations.

6. The method for mobility management in wireless networks as claimed in claim 1, wherein, in said step (e), said mobile device decides an access point based on an evaluation mechanism.

7. The method for mobility management in wireless networks as claimed in claim 1, wherein, in said step (f), said corresponding node sends packets for said mobile device to said mobile device after being informed by said mobile device.

8. The method for mobility management in wireless networks as claimed in claim 1, wherein, after finishing said step (f), all allocated resources for said packet relay service are released.

9. The method for mobility management in wireless networks as claimed in claim 1, wherein, in said step (a), said candidate network domains include the network domain currently in use, as well as the new network domains which said mobile device may be handed over to.

10. The method for mobility management in wireless networks as claimed in claim 2, wherein, said preset mechanism is obtaining said network configurations via resource management service provided by said MMS device, via a server to get said network configurations, or using preset network configurations.

11. A mobility management server (MMS) device for mobility management in wireless networks, said wireless networks having one mobile device in a first network domain in connection with one corresponding node, said mobile device selecting one or more access point (AP) candidates which said mobile device intends to connect to, providing said MMS device with information of said AP candidates, obtaining network configurations of candidate network domains from said MMS device, and requesting said MMS device to initiate a packet relay service according to said network configurations, said MMS device managing handover of said mobile device to a second network domain, and said MMS device comprising:

a resource management service unit, which in response to request of said mobile device for said packet relay service is responsible for managing the resource needed for packet relay for said mobile device during handover to said second network domain; and a data relay service unit, which is responsible for packet relay for said mobile device during handover to said second network domain by relaying packets for said mobile device to two or more candidate IP addresses that said mobile device may use including IP address in said first network domain, and IP addresses in all candidate network domains;

wherein said mobile device informs said corresponding node of temporarily redirecting packets for said mobile device to said MMS device, connects to a chosen AP of said AP candidates, establishes a network connection through the chosen AP, updates registration information at a communication server of said chosen AP, and informs said corresponding node of sending packets to said mobile device.

12. The MMS device as claimed in claim 11, wherein said MMS device is realized by one or more servers.

13. The MMS device as claimed in claim 11, wherein said wireless networks further include one or more mobile devices.

14. The MMS device as claimed in claim 13, wherein varieties of said one or more mobile devices include a notebook computer, mobile phone, and a personal digital assistant.

15. The MMS device as claimed in claim 11, wherein the resources needed for packet relay include memory buffer, bandwidth and relay IP address/port, or the combination of afore said items.

16. The MMS device as claimed in claim 11, wherein said resource management service unit further provides related information as well as related network configuration regarding an access point in said second network domain.

17. The MMS device as claimed in claim 16, wherein said related information regarding the access point of said second network domain includes Basic Service Set Identifier (BSSID) of the access point, Service Set Identity (SSID) of the access point, Media Access Control address for the access point, or any combination of afore said items.

* * * * *